United States Patent
Thomas et al.

(10) Patent No.: US 9,535,865 B2
(45) Date of Patent: *Jan. 3, 2017

(54) INTERCONNECTION OF MULTIPLE CHIPS IN A PACKAGE

(75) Inventors: Thomas P. Thomas, Beaverton, OR (US); Randy B. Osborne, Beaverton, OR (US); Rajesh Kumar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 752 days.

This patent is subject to a terminal disclaimer.

(21) Appl. No.: 13/996,107

(22) PCT Filed: Dec. 22, 2011

(86) PCT No.: PCT/US2011/066976
§ 371 (c)(1),
(2), (4) Date: Jun. 20, 2013

(87) PCT Pub. No.: WO2013/095538
PCT Pub. Date: Jun. 27, 2013

(65) Prior Publication Data
US 2014/0201405 A1    Jul. 17, 2014

(51) Int. Cl.
*G06F 13/00*      (2006.01)
*G06F 13/364*    (2006.01)
(Continued)

(52) U.S. Cl.
CPC ........... *G06F 13/364* (2013.01); *G06F 3/0488* (2013.01); *G06F 13/14* (2013.01); *G06F 13/16* (2013.01);
(Continued)

(58) Field of Classification Search
USPC .................................................. 710/104–110
See application file for complete search history.

(56) References Cited

U.S. PATENT DOCUMENTS

| 5,432,823 A | 7/1995 | Gasbarro et al. |
| 6,246,721 B1 * | 6/2001 | Zhang ........................ G06F 1/10 327/247 |

(Continued)

FOREIGN PATENT DOCUMENTS

| CN | 1859358 A | 11/2006 |
| EP | 1577786 | 9/2005 |

(Continued)

OTHER PUBLICATIONS

"A 10Gb/s Compact Low-Power Serial I/O With DFT-IIR Equalization in 65nm CMOS", Byungsub et al.; Date: Dec. 2009; vol. 44, No. 12, pp. 3526-3538, 13 pages; Publisher: IEEE.*

(Continued)

*Primary Examiner* — Raymond Phan
(74) *Attorney, Agent, or Firm* — Blakely, Sokoloff, Taylor & Zafman LLP

(57) ABSTRACT

An interface. A first set of single-ended transmitter circuits reside on a first die having a master device. A first set of single-ended receiver circuits reside on a second die. The receiver circuits have no termination and no equalization. The second die has a slave device responsive to the master device of the first die. Conductive lines connect the first set of transmitter circuits and the first set of receiver circuits. The lengths of the conductive lines are matched.

18 Claims, 4 Drawing Sheets

(51) Int. Cl.
*G06F 13/14* (2006.01)
*G06F 13/40* (2006.01)
*G06F 13/42* (2006.01)
*G06F 3/0488* (2013.01)
*G06F 13/16* (2006.01)

(52) U.S. Cl.
CPC ....... *G06F 13/4068* (2013.01); *G06F 13/4273* (2013.01); *Y02B 60/1228* (2013.01); *Y02B 60/1235* (2013.01)

(56) References Cited

U.S. PATENT DOCUMENTS

| | | | |
|---|---|---|---|
| 6,968,024 B1 | 11/2005 | Perino | |
| 6,998,870 B1* | 2/2006 | Gulick | H04L 25/0278 326/26 |
| 7,205,787 B1 | 4/2007 | Massoumi et al. | |
| 2007/0250765 A1* | 10/2007 | Chen | G06F 17/246 715/234 |
| 2012/0120996 A1* | 5/2012 | McCombs | G06F 12/1027 375/224 |

FOREIGN PATENT DOCUMENTS

| | | |
|---|---|---|
| TW | 200919171 | 5/2009 |
| TW | 201145750 | 12/2011 |

OTHER PUBLICATIONS

International Preliminary Report on Patentability for PCT/US2011/066976 mailed Jul. 3, 2014, 7 pages.
Office Action and Search Report for Taiwan Patent Application No. 101143477 mailed May 22, 2014, 11 pages.
International Search Report and Written Opinion for PCT/US2011/066976 mailed Sep. 24, 2012, 10 pages.

* cited by examiner

INTERCONNECTION OF MULTIPLE CHIPS IN A PACKAGE

TECHNICAL FIELD

Embodiments of the invention relate to input/output architectures and interfaces. More particularly, embodiments of the invention relate to high-bandwidth on-package input/output architectures and interfaces.

BACKGROUND

High bandwidth interconnections between chips using conventional input/output (I/O) interfaces require significant power and chip area. Thus, in applications requiring smaller chip areas and/or reduced power consumption, these conventional interfaces are not desirable.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described herein is an On-Package I/O (OPIO) interface that solves the problems of conventional I/O interfaces by providing very high bandwidth I/O between chips in a Multi Chip Package (MCP) with very low power, area and latency. OPIO may be useful, for example, to interconnect a processor to memory (eDRAM/DRAM), another processor, a chip set, a graphics processor, or any other chip in a MCP with an order of magnitude lower energy per bit and area per bandwidth compared to conventional I/O.

Various embodiments of the interfaces described herein include one or more of the following components: (1) a single-ended, high-speed I/O interface (e.g., CMOS interface) between IC chips in a MCP with a relatively small die-to-die gap; (2) an impedance matched transmitter (e.g., CMOS transmitter) with no termination or very weak termination, and no equalization; (3) a forwarded clock signal for a cluster of signals with length-matched routing to minimize or eliminate per pin de-skew; and/or (4) reduced electrostatic discharge (ESD) protection (e.g., 70 V) to provide lower pad capacitances and higher data rates.

Close chip assembly in MCP enables very short length matched I/O traces, which in turn enables OPIO architectures described herein to run at high bandwidth using simplified single-ended I/O and clocking circuits to reduce power, area and latency. In one embodiment, high-speed, single-ended I/O with minimum bump pitch reduces bump limited silicon area for required bandwidth.

In one embodiment, use of a CMOS transmitter and receiver with no or weak receiver termination and no equalization can reduce I/O power. Simplified clocking with forwarded clock per cluster of signals and no per pin de-skew can be achieved due to careful length matched routing reduces clock power. Thus, the OPIO architectures described herein provide high bandwidth between chips at very low power, area and latency. MCP with OPIO provides product, process and die area flexibility without significant power and area overhead. The OPIO architectures described herein can also be extended to close discrete packages with full ESD protection for small form factor mobile applications at lower data rates. Multi-level (e.g., M-PAM) signaling can be used at higher data rates to keep the clock frequency down.

Figure 1:
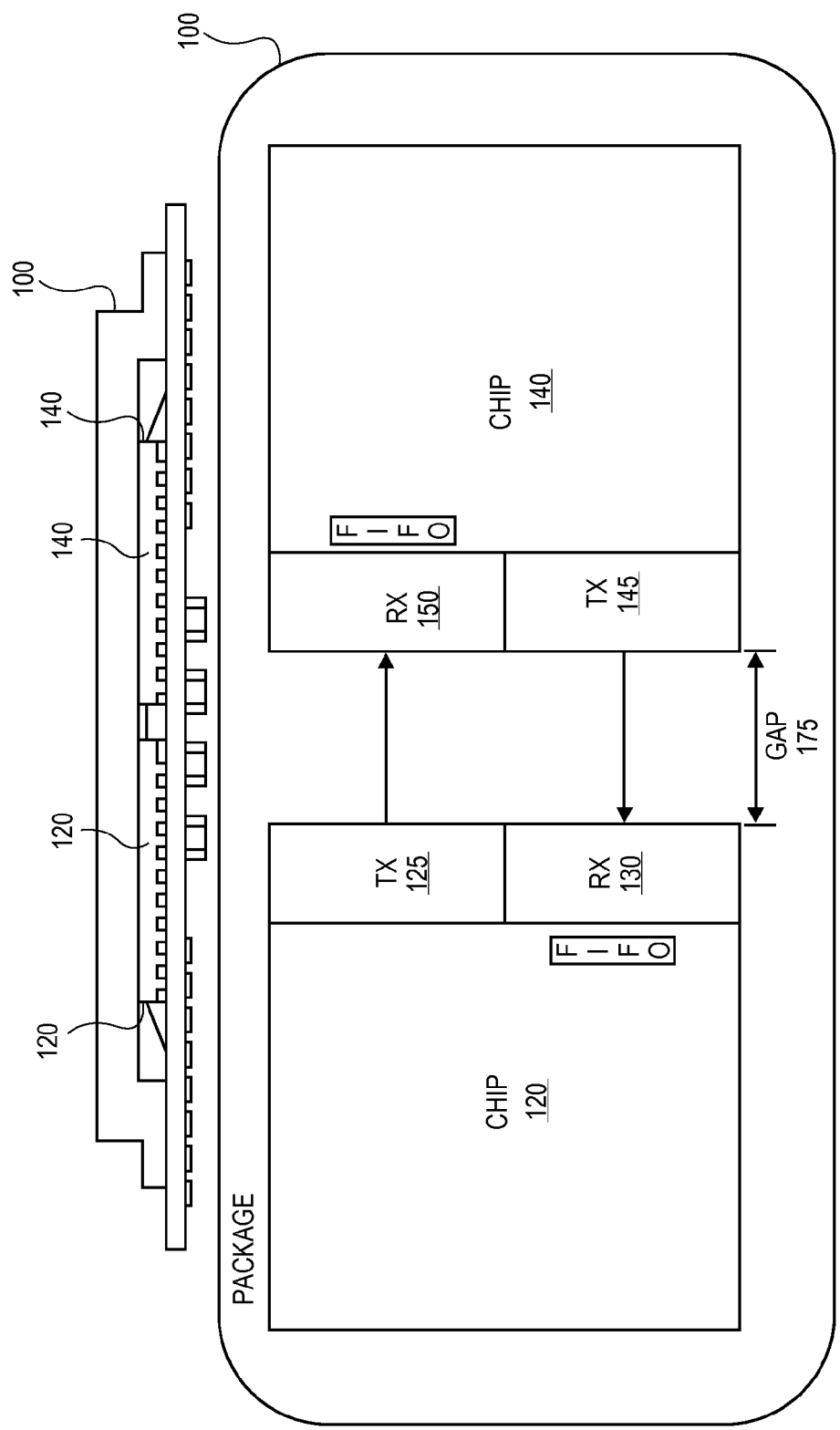
FIG. 1 is a block diagram of one embodiment of a multichip package (MCP) having on-package input/output (OPIO) interfaces between at least two chips.

FIG. 1 is a block diagram of one embodiment of a multichip package (MCP) having on-package input/output (OPIO) interfaces between at least two chips. The example of FIG. 1 illustrates two chips with interfaces; however, any number of chips within a package can be interconnected using the techniques described herein.

Package 100 may be any type of package that may contain multiple integrated circuit chips. In the example of FIG. 1, package 100 contains chip 120 and chip 140. These chips may be, for example, processors, memory chips, graphics processors, etc.

In one embodiment, chip 120 includes OPIO transmitters 125 and OPIO receivers 130. Similarly, chip 140 includes OPIO transmitters 145 and OPIO receivers 150. Transmitters 125 are coupled with receivers 150 and transmitters 145 are coupled with receivers 130.

In one embodiment, gap 175 between chip 120 and chip 140 is relatively small. In one embodiment, gap 175 is less than 20 mm. In one embodiment, gap 175 is less than 10 mm. In one embodiment, gap 175 is approximately 1.5 mm. In other embodiments, gap 175 may be less than 1.5 mm. In general, the smaller gap 175, the greater the bandwidth that may be provided between chips.

In one embodiment, the interfaces between transmitter 125 and receiver 150, and between transmitter 145 and receiver 130 are single-ended, relatively high-speed interfaces. In one embodiment, the interfaces are CMOS interfaces between chip 120 and chip 140. In one embodiment, transmitters 125 and 145 are impedance matched CMOS transmitters and no termination or equalization is provided. In one embodiment, transmitters 125 and 145 are impedance matched CMOS transmitters and very weak termination and no equalization is provided.

In one embodiment, a forwarded clock signal it transmitted for a cluster of signals. In one embodiment, length-matched routing is provided between the transmitters and the receivers. In one embodiment, minimal electrostatic discharge (ESD) protection (as little as 70 Volts) is provided for the interfaces between chips 120 and 140.

In one embodiment, use of a CMOS transmitter and receiver with no or weak receiver termination and no equalization can reduce I/O power. Simplified clocking with forwarded clock per cluster of signals and no per pin dc-skew can be achieved due to careful length matched routing reduces clock power. Thus, the architectures described herein provide high bandwidth between chips at very low power, area and latency.

The architectures described herein can also be extended to close discrete packages with full ESD protection for small form factor mobile applications at lower data rates. Multi-level (e.g., M-PAM) signaling can be used at higher data rates to keep the clock frequency down.

Connecting a processor die to an external memory die using conventional input/output (I/O) interfaces requires significant power and chip area, and may not provide sufficient bandwidth for high performance processor cache or memory within the budgeted power, area and/or latency. On-die cache memories can provide only partial solution.

The architecture described above may be utilized to connect, for example, a processor core on one die to a memory or cache on another die within a single package to provide very high bandwidth with low power consumption. The memory may be, for example, a dynamic random access memory (DRAM), an embedded DRAM (eDRAM), stacked DRAM, non-volatile memory (e.g., flash memory, phase change memory (PCM)), etc. In one embodiment, the interfaces described herein may provide an order of magnitude lower energy per bit and area per bandwidth compared to traditional I/O interfaces.

Various embodiments of the architectures described herein may include one or more of the following. A processor die and one or more memory dice (e.g., DRAM, eDRAM, stacked DRAM, flash, PCM) connected using a high bandwidth, low power interface, for example, the interface described with respect to FIG. 1. In one embodiment, multiple memory devices (e.g., DRAM, eDRAM, stacked DRAM, flash, PCM) may be connected to a single high bandwidth, low power interface. In one embodiment, a logic circuit may be used to combine multiple lower bandwidth connection, for example, multiple through silicon via (TSV) interfaces into a single high bandwidth, low power interface. In another embodiment, the memory devices may be, for example, stacked DRAM or stacked non-volatile memory.

Close assembly of the processor die and one or more memory or cache dice within a multi-chip package may support a short, length matched I/O interfaces that enables high bandwidth, low power transmission using a high-speed I/O interface. These interfaces may use simplified single-ended lines and clocking circuits that reduce power, area and latency. High-speed single-ended I/O interfaces with minimum bump pitch reduces bump limited silicon area for the supported bandwidth. Simplified clocking with a forwarded clock per cluster of signals can provide no per-pin deskew due to length-matched routing that reduces clock power.

Figure 2:
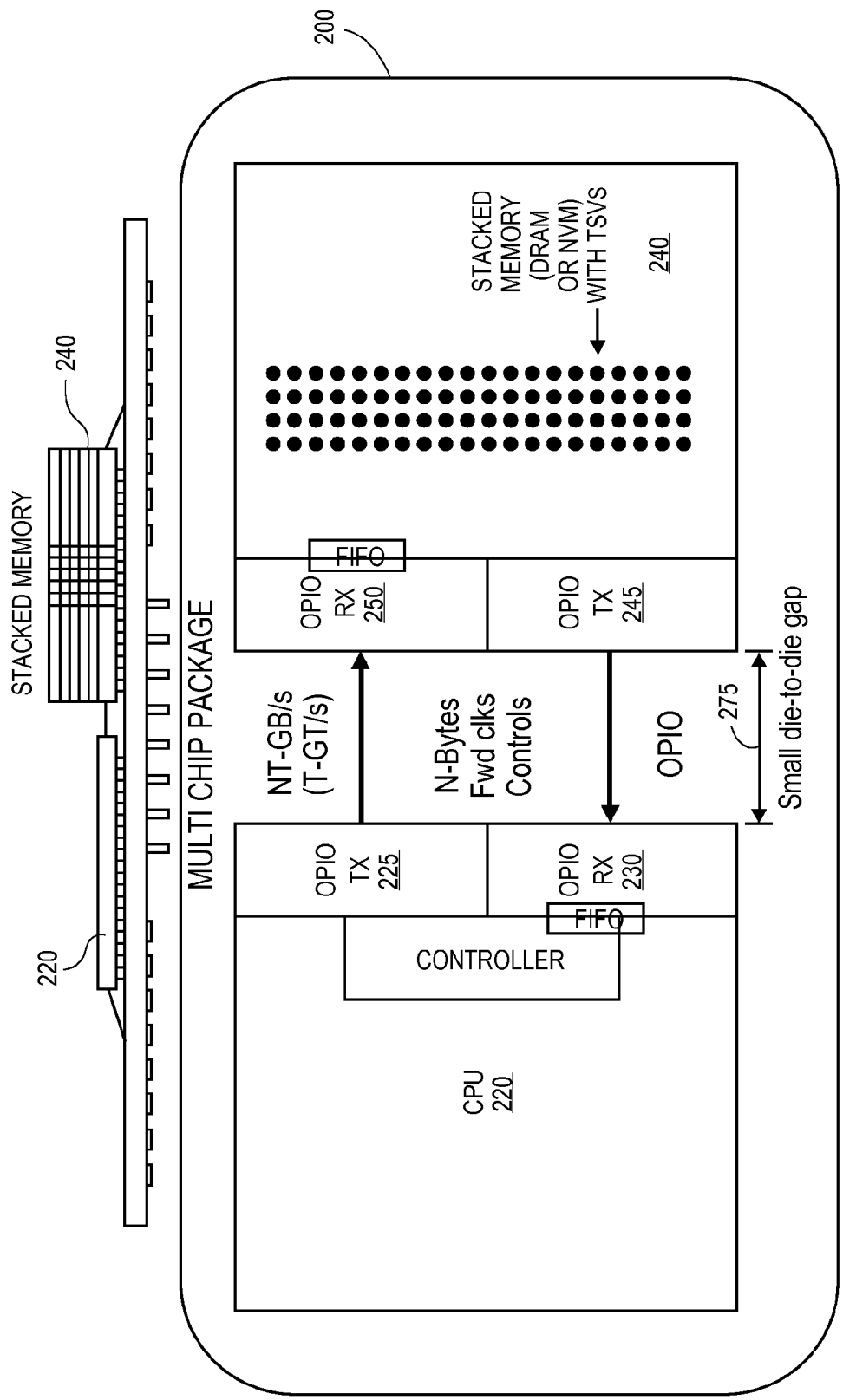
FIG. 2 is a block diagram of one embodiment of a MCP having OPIO interfaces with a stacked memory.

FIG. 2 is a block diagram of one embodiment of a MCP having OPIO interfaces with a stacked memory. The example of FIG. 2 illustrates a die with an interface to a stacked memory device. Any number of chips within a package can be interconnected using the techniques described herein. The stacked memory may be any one of DRAM, eDRAM, stacked DRAM, flash, PCM, or any other suitable memory device.

Package 200 may be any type of package that may contain multiple integrated circuit chips. In the example of FIG. 2, package 200 contains processor chip 220 and stacked memory 240. In one embodiment, processor 220 includes OPIO transmitters 225 and OPIO receivers 230. Similarly, stacked memory 240 includes OPIO transmitters 245 and OPIO receivers 250. Transmitters 225 are coupled with receivers 250 and transmitters 245 are coupled with receivers 230.

In one embodiment, gap 275 between processor 220 and stacked memory 240 is relatively small. In one embodiment, gap 275 is less than 20 mm. In one embodiment, gap 275 is less than 10 mm. In one embodiment, gap 275 is approximately 1.5 mm. In other embodiments, gap 275 may be less than 1.5 mm. In general, the smaller gap 275, the greater the bandwidth that may be provided between chips.

In one embodiment, the interfaces between transmitter 225 and receiver 250, and between transmitter 245 and receiver 230 are single-ended, relatively high-speed interfaces. In one embodiment, the interfaces are CMOS interfaces between processor 220 and stacked memory 240. In one embodiment, transmitters 225 and 245 are impedance matched CMOS transmitters and no termination or equalization is provided. In one embodiment, transmitters 225 and 245 are impedance matched CMOS transmitters and very weak termination and no equalization is provided. In another embodiment, matched receiver termination is provided.

In one embodiment, a forwarded clock signal it transmitted for a cluster of signals. In one embodiment, length-matched routing is provided between the transmitters and the receivers. In one embodiment, minimal electrostatic discharge (ESD) protection (as little as 70 Volts) is provided for the interfaces between chips 220 and 240.

In one embodiment, stacked memory 240 may utilize aggregation logic to aggregate data flow to/from locations within stacked memory 240. For example, stacked memory 240 may have an internal data flow that supports a lower individual bandwidth than the OPIO interface. Thus, data from multiple locations may be aggregated and transmitted over the high bandwidth, low power interfaces described herein.

In another embodiment, subsets of lines within the OPIO interface (aka, clusters) may be coupled with different portions of stacked memory 240 to allow use of the OPIO interface without the aggregation logic discussed above. Thus, the OPIO architecture described herein may be used within stacked memory 240 as well as between processor 220 and stacked memory 240.

Figure 3:
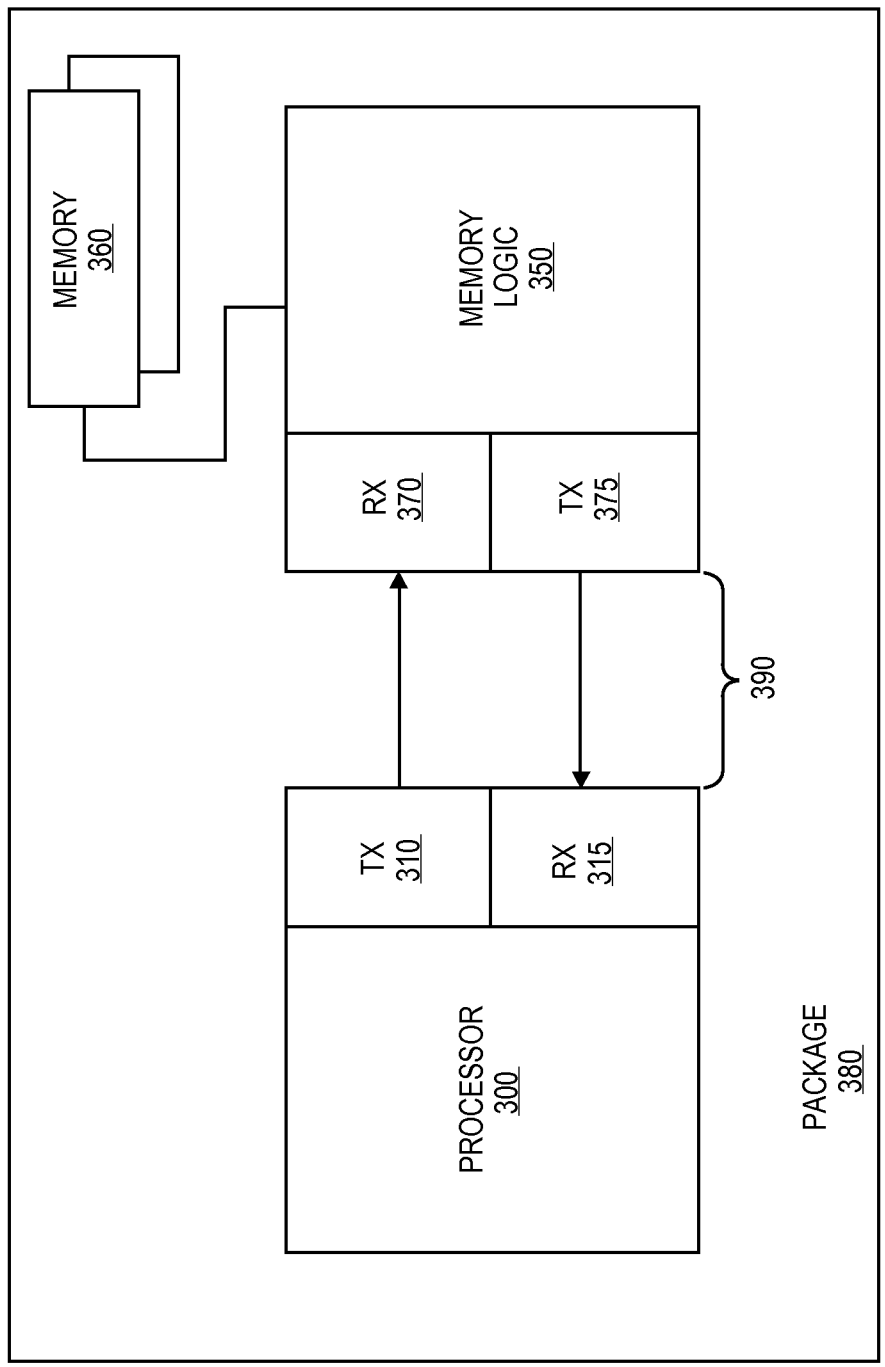
FIG. 3 is a block diagram of one embodiment of a MCP having OPIO interfaces with a memory system.

FIG. 3 is a block diagram of one embodiment of a MCP having OPIO interfaces with a memory system. The arrangement of FIG. 3 operates in a similar manner as that of FIG. 2 except that the memory dies are not stacked and can be interconnected with the memory logic with an OPIO interface or any other type of interface. Any number of chips within a package can be interconnected using the techniques described herein. The memory may be any one of DRAM, eDRAM, stacked DRAM, flash, PCM, or any other suitable memory device.

Package 380 may be any type of package that may contain multiple integrated circuit chips. In the example of FIG. 3, package 380 contains processor chip 300 and memory logic 350 and memory 360, which may be multiple memory dies. In one embodiment, processor 300 includes OPIO transmitters 310 and OPIO receivers 315. Similarly, memory logic 350 includes OPIO transmitters 375 and OPIO receivers 370. Transmitters 310 are coupled with receivers 370 and transmitters 375 are coupled with receivers 315.

In one embodiment, gap 390 between processor 300 and memory logic 350 is relatively small. In one embodiment, gap 390 is less than 20 mm. In one embodiment, gap 390 is less than 10 mm. In one embodiment, gap 390 is approximately 1.5 mm. In other embodiments, gap 390 may be less than 1.5 mm. In general, the smaller gap 390, the greater the bandwidth that may be provided between chips.

In one embodiment, the interfaces between transmitter 310 and receiver 370, and between transmitter 375 and receiver 315 are single-ended, relatively high-speed interfaces. In one embodiment, the interfaces are CMOS interfaces between processor 300 and memory logic 350. In one embodiment, transmitters 310 and 375 are impedance matched CMOS transmitters and no termination or equalization is provided. In one embodiment, transmitters 310 and 375 are impedance matched CMOS transmitters and very weak termination and no equalization is provided. In another embodiment matched receiver termination is provided.

In one embodiment, a forwarded clock signal it transmitted for a cluster of signals. In one embodiment, length-matched routing is provided between the transmitters and the receivers. In one embodiment, minimal electrostatic discharge (ESD) protection (as little as 70 Volts) is provided for the interfaces between chips 300 and 350.

In one embodiment, memory logic 350 may operate to aggregate data flow to/from locations within memory 360. For example, memory logic 350 may have an internal data flow that supports a lower individual bandwidth than the OPIO interface. Thus, data from multiple locations may be aggregated and transmitted over the high bandwidth, low power interfaces described herein.

Figure 4:
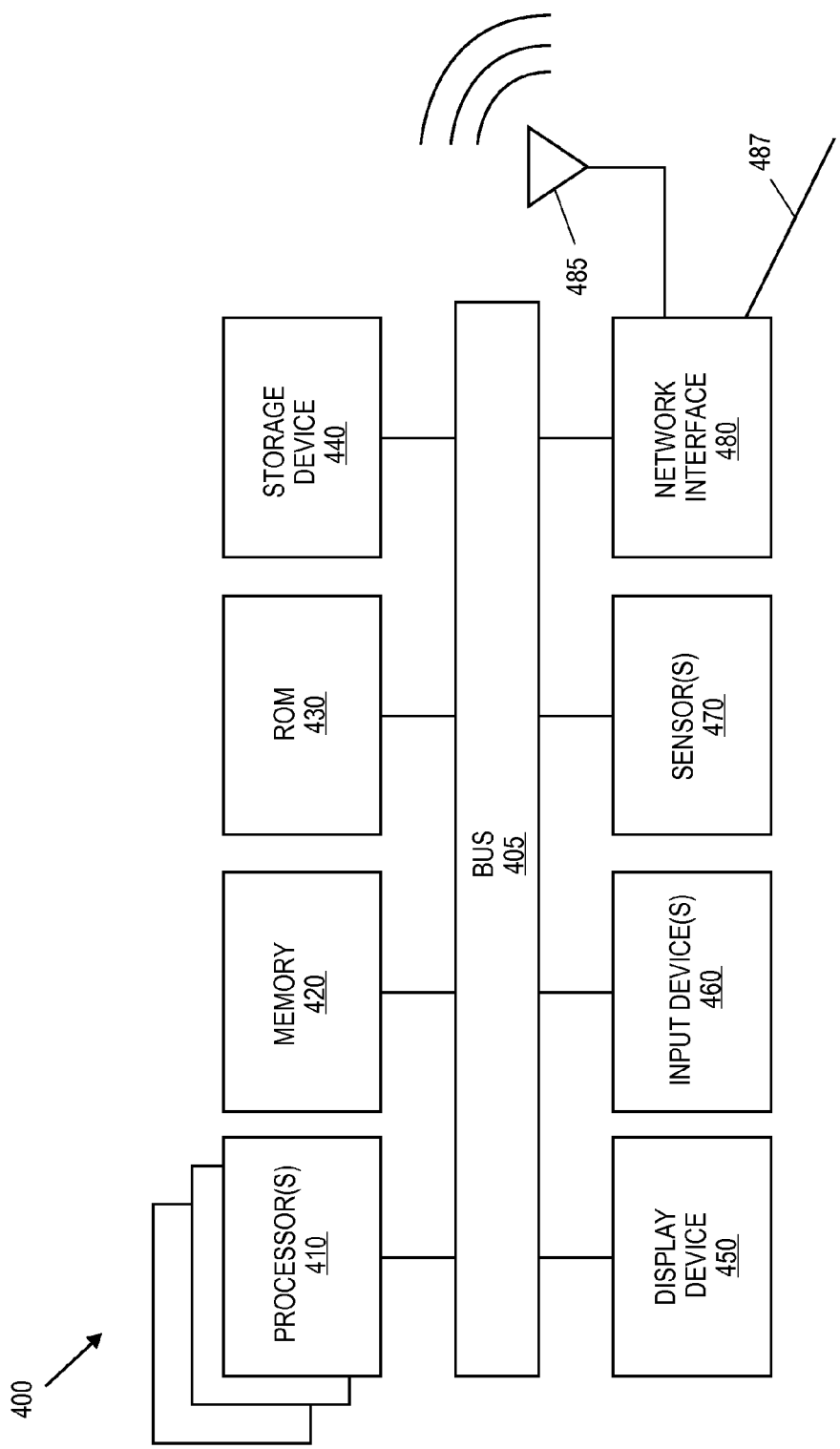
FIG. 4 is a block diagram of one embodiment of an electronic system.

FIG. 4 is a block diagram of one embodiment of an electronic system. The electronic system illustrated in FIG. 4 is intended to represent a range of electronic systems (either wired or wireless) including, for example, a tablet device, a smartphone, a desktop computer system, a laptop computer system, etc. Alternative electronic systems may include more, fewer and/or different components.

One or more of the components illustrated in FIG. 4 may be interconnected utilizing the OPIO architectures described herein. For example, multiple processor chips may be interconnected, or a processor and a cache memory or dynamic random access memory, etc.

Electronic system 400 includes bus 405 or other communication device to communicate information, and processor(s) 410 coupled to bus 405 that may process information. Electronic system 400 may include multiple processors and/or co-processors. Electronic system 400 further may include random access memory (RAM) or other dynamic storage device 420 (referred to as memory), coupled to bus 405 and may store information and instructions that may be executed by processor 410. Memory 420 may also be used to store temporary variables or other intermediate information during execution of instructions by processor(s) 410.

Electronic system 400 may also include read only memory (ROM) and/or other static storage device 430 coupled to bus 405 that may store static information and instructions for processor 410. Data storage device 440 may be coupled to bus 405 to store information and instructions. Data storage device 440 such as a magnetic disk or optical disc and corresponding drive may be coupled to electronic system 400.

Electronic system 400 may also be coupled via bus 405 to display device 450, which can be any type of display device, to display information to a user, for example, a touch screen. Input device 460 may be any type of interface and/or device to allow a user to provide input to electronic system 400. Input device may include hard buttons and/or soft buttons, voice or speaker input, to communicate information and command selections to processor(s) 410.

Electronic system 400 may further include sensors 470 that may be used to support functionality provided by Electronic system 400. Sensors 470 may include, for example, a gyroscope, a proximity sensor, a light sensor, etc. Any number of sensors and sensor types may be supported.

Electronic system 400 further may include network interface(s) 480 to provide access to a network, such as a local area network. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

In one embodiment, network interface(s) 480 may provide access to a local area network, for example, by conforming to IEEE 802.11b and/or IEEE 802.11g and/or IEEE 802.11n standards, and/or the wireless network interface may provide access to a personal area network, for example, by conforming to Bluetooth standards. Other wireless network interfaces and/or protocols can also be supported. Network access may also be provided in accordance with 4G/LTE standards as well.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 480 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
   a semiconductor chip package comprising:
   a) a first set of single-ended transmitter circuits on a first die having a master device wherein the single-ended transmitter circuits have no equalization;
   b) a first set of single-ended receiver circuits on a second die, wherein the receiver circuits have no termination and no equalization, the second die having a slave device responsive to the master device of the first die; and
   c) a plurality of conductive lines between the first set of transmitter circuits and the first set of receiver circuits, wherein the lengths of the plurality of conductive lines are matched.

2. The apparatus of claim 1, wherein the first die comprises at least a processor core, the apparatus further comprising a touch screen interface coupled with the processor core.

3. The apparatus of claim 1 wherein the master device comprises a processor core and the slave device comprises a memory.

4. The apparatus of claim 1 wherein the slave device comprises circuitry to aggregate data from multiple memory devices.

5. The apparatus of claim 4 wherein the multiple memory devices comprise a stacked memory having at least a first memory die vertically stacked on a second memory die.

6. The apparatus of claim 5 wherein the semiconductor chip package further comprises:
   d) a second set of single-ended transmitter circuits on the second memory die;
   e) a second set of single-ended receiver circuits on the first die, wherein the receiver circuits have no termination and no equalization; and
   f) a plurality of conductive lines between the second set of transmitter circuits and the second set of receiver circuits, wherein the lengths of the plurality of conductive lines are matched.

7. A tablet computing device comprising:
   a) touch screen interface;
   b) a semiconductor chip package comprising:
      i) a first set of single-ended transmitter circuits on a first die having a master device wherein the single-ended transmitter circuits have no equalization;
      ii) a first set of single-ended receiver circuits on a second die, wherein the receiver circuits have no termination and no equalization, the second die having a slave device responsive to the master device of the first die; and
      iii) a plurality of conductive lines between the first set of transmitter circuits and the first set of receiver circuits, wherein the lengths of the plurality of conductive lines are matched.

8. The tablet computing device of claim 7 further comprising an antenna coupled with the first die.

9. The tablet computing device of claim 7 wherein the master device comprises a processor core and the slave device comprises a memory.

10. The tablet computing device of claim 7 wherein the slave device comprises a circuitry to aggregate data from multiple memory devices.

11. The tablet computing device of claim 10 wherein the multiple memory devices comprises a stacked memory having at least a first memory die vertically stacked on a second memory die.

12. The tablet computing device of claim 11 wherein the semiconductor chip package further comprises:
   d) a second set of single-ended transmitter circuits on the second memory die;
   e) a second set of single-ended receiver circuits on the first die, wherein the receiver circuits have no termination and no equalization; and
   f) a plurality of conductive lines between the second set of transmitter circuits and the second set of receiver circuits, wherein the lengths of the plurality of conductive lines are matched.

13. A system comprising:
   a) an omnidirectional antenna;
   b) a semiconductor chip circuit package comprising:
      i) a first set of single-ended transmitter circuits on a first die having a master device wherein the single-ended transmitter circuits have no equalization;
      ii) a first set of single-ended receiver circuits on a second die, wherein the receiver circuits have no termination and no equalization, the second die having a slave device responsive to the master device of the first die; and
      iii) a plurality of conductive lines between the first set of transmitter circuits and the first set of receiver circuits, wherein the lengths of the plurality of conductive lines are matched.

14. The system of claim 13, wherein the first die comprises at least a processor core, the apparatus further comprising a touch screen interface coupled with the processor core.

15. The system of claim 13 wherein the master device comprises a processor core and the slave device comprises a memory.

16. The system of claim 13 wherein the slave device comprises circuitry to aggregate data from multiple memory devices.

17. The system of claim 16 wherein the multiple memory devices comprises a stacked memory having at least a first memory die vertically stacked on a second memory die.

18. The system of claim 17 further comprising wherein the semiconductor chip package further comprises:
   d) a second set of single-ended transmitter circuits on the second memory die;
   e) a second set of single-ended receiver circuits on the first die, wherein the receiver circuits have no termination and no equalization; and
   f) a plurality of conductive lines between the second set of transmitter circuits and the second set of receiver circuits, wherein the lengths of the plurality of conductive lines are matched.

* * * * *